US008648000B2

(12) United States Patent
Chirinos-Colina et al.

(10) Patent No.: US 8,648,000 B2
(45) Date of Patent: Feb. 11, 2014

(54) DIENE POLYMERISATION

(75) Inventors: Juan Jose Chirinos-Colina, Edo. Zulia (VE); Vernon Charles Gibson, London (GB); Grant Berent Jacobsen, Sandringham (AU)

(73) Assignee: Ineos Commercial Services UK Limited, Hampshire (GB)

( * ) Notice: Subject to any disclaimer, the term of this patent is extended or adjusted under 35 U.S.C. 154(b) by 691 days.

(21) Appl. No.: 11/976,734

(22) Filed: Oct. 26, 2007

(65) Prior Publication Data
US 2008/0293896 A1 Nov. 27, 2008

(30) Foreign Application Priority Data

Oct. 31, 2006 (EP) .................................... 06255605

(51) Int. Cl.
*C08F 4/69* (2006.01)
*C08F 4/70* (2006.01)
*C08F 36/04* (2006.01)
*C08F 36/06* (2006.01)

(52) U.S. Cl.
USPC ........... 502/113; 502/117; 502/121; 502/122; 502/123; 502/129; 502/162; 502/167; 526/115; 526/117

(58) Field of Classification Search
USPC ......... 502/113, 117, 121, 122, 123, 129, 162, 502/167; 526/115, 117
See application file for complete search history.

(56) References Cited

U.S. PATENT DOCUMENTS

| 5,879,805 A | * | 3/1999 | Brady et al. | 428/407 |
| 6,461,994 B1 | * | 10/2002 | Gibson et al. | 502/155 |
| 6,683,141 B1 | * | 1/2004 | Gibson et al. | 526/161 |

FOREIGN PATENT DOCUMENTS

WO WO 2004/083263 A1 * 9/2004

* cited by examiner

Primary Examiner — Roberto Rabago
(74) Attorney, Agent, or Firm — Nixon & Vanderhye

(57) ABSTRACT

Process for producing homopolymers or copolymers of conjugated dienes by contacting monomeric material including at least one conjugated diene with a catalyst system comprising (A) a first transition metal compound selected from Cr, Mo and W compounds, and a second transition metal compound selected from Fe, Co and Ni compounds, (B) a catalyst modifier and, optionally, (C) one or more catalyst activators.

6 Claims, No Drawings

DIENE POLYMERISATION

This application claims priority to European Application No. 06255605.5, filed 31 Oct. 2006. The entire content of this application is incorporated herein by reference.

The present invention relates to diene polymers and copolymers and to a process for making such polymers and copolymers using certain transition metal-based catalysts.

WO 2004/083263 published in the name of BP Chemicals on 30 Sep. 2004 relates to a transition metal complex polymerisation catalyst and to a process for the polymerisation and copolymerisation of 1-olefins, cyclo-olefins or dienes, comprising contacting the monomer with the catalyst. Monomers disclosed therein as suitable for use in making homopolymers are ethylene, propylene, butene, hexene, styrene or conjugated or non-conjugated dienes. Preferred monomers are ethylene and propylene. Monomers disclosed as suitable for making copolymers are ethylene, propylene, 1-butene, 1-hexene, 4-methylpentene-1, 1-octene, norbornene, substituted norbornenes, dienes, eg butadiene, ethylidene norbornene, methyl methacrylate, methyl acrylate, butyl acrylate, acrylonitrile, vinyl acetate, vinyl chloride, and styrene.

U.S. Pat. No. 5,879,805 discloses a process for the preparation of 1,2-vinyl-polybutadiene with an adjustable amount of vinyl linkages in the microstructure of the polymer by polymerising 1,3-butadiene in the gas phase using a catalyst comprising (a) a cobalt compound; (b) a compound selected from the group consisting of a phosphine, a xanthogen, a thiocyanide, a carbon disulphide, and mixtures thereof; (c) an organoaluminium compound; and optionally (d) a defined modifier.

U.S. Pat. No. 4,340,685 discloses a process for preparing polybutadiene having 1,2-vinyl-configuration of 5 to 40% and a cis-1,4 configuration of 60% or more by polymerising 1,3-butadiene in the presence of a catalyst consisting of a (A) cobalt compound, (B) a defined alkylaluminium or organolithium compound, (C) phenyl isothiocyanate or carbon disulphide in a hydrocarbon or halohydrocarbon solution of a high cis-1,4-polybutadiene obtained by polymerising butadiene with a catalyst consisting of (D) a defined nickel compound (E) a boron fluoride or HF and (F) a defined Group II or III organometal compound.

There is a commercial need to provide polydienes having a controlled microstructure. For example, commercially available polybutadienes have a microstructure comprising butadiene units polymerised in cis-, and/or trans-, and/or 1,2-vinyl manner. This need can generally be met for example by polymerising butadiene to form separate polymers having known cis, trans and 1,2-vinyl contents and blending these polymers to produce the desired product. However, blending polymers is expensive in terms of energy usage, equipment costs and time and can be technically difficult especially when the polymers have high molecular weight, poor compatibility or sensitivity to mechanical blending. There is thus a commercial need to provide polydienes having a controllable content of cis-, trans- and 1,2-vinyl units without the need for post reactor mechanical blending of the component polydienes.

An object of the present invention is to provide a process for producing polymers of conjugated dienes, for example, butadiene or isoprene. A further object is to provide polymers of conjugated dienes wherein the polymer has a controllable level of cis-, trans- and 1,2-vinyl without the need for post-reactor blending.

Accordingly the present invention provides a process for producing homopolymers or copolymers of conjugated dienes comprising contacting monomeric material comprising at least one conjugated diene with a catalyst system comprising (A) a first transition metal compound selected from Cr, Mo and W compounds, and a second transition metal compound selected from Fe Co and Ni compounds (B) a catalyst modifier and optionally (C) one or more catalyst activators.

Surprisingly it has been found that use of the defined catalyst system provides polydienes having a desirable range of properties. Without wishing to limit the generality of this statement, it has been found, for example, that varying the ratio of first:second defined transition metal compounds in the catalyst composition leads to useful variations in the ratio of trans/cis microstructure, and that by control of the level of the catalyst modifier its possible to provide useful changes in the 1,2-vinyl content of the produced diene polymer. Thus for example by changing the mole ratios of Co:Cr in a cobalt/chromium mixed catalyst system it has been found that useful variations in the cis:trans content of the produced polydiene can be achieved and that varying the concentration of catalyst modifier provides useful control of the relative amount of 1,2-deine polymer produced.

The monomeric material comprises at least one diene and optionally one or more 1-olefins. Dienes employed in the polymerisation process of the present invention preferably have the general formula $R^1R^2C{=}CR^3CR^4{=}CR^5CR^6$ wherein $R^1$ to $R^6$ are independently selected from hydrogen, halogen, alkyl, cycloalkyl, aryl, aralkyl and alkaryl. For example they can be chloro, methyl, ethyl, n-propyl, isopropyl, or single or mixtures of isomeric forms of pentyl, hexyl, octyl, decyl; or aryl groups selected from, for example, phenyl, 2 chloro-phenyl, o-biphenyl, naphthyl, phenanthryl and anthryl; or alkaryl groups selected from, for example, phenylmethyl, phenylethyl, phenyl-n-propyl, naphthylmethyl; or aralkyl groups, for example, tolyl. xylyl, mesityl or 2-methylnaphthyl. However, when the diene is too heavily substituted by bulky groups it may be difficult or impossible to cause the diene to polymerise due to steric hindrance. The diene employed preferably has the general formula $R^1H{-}C{=}CR^3{-}CH{=}CH_2$ wherein $R^1$ and $R^3$ are independently selected from hydrogen, chlorine and a $C_1$ to $C_{10}$ hydrocarbyl group. Preferred dienes are 1,3-butadiene, 2-methyl-1,3-butadiene (isoprene), and 2-chloro-1,3-butadiene (chloroprene).

The monomeric material used in the polymerisation process of the present invention can contain one or more 1-olefins. Suitable 1-olefins are any which are capable of being copolymerised with conjugated dienes. Examples of suitable 1-olefins are ethylene, propylene, butene, hexene, 4-methylpentene-1, 1-octene, norbornene, substituted norbornenes and styrene.

Preferably the copolymers prepared by the process comprise polymerised units of a conjugated diene and up to 99.0 moles percent of a $C_1$ to $C_{20}$ 1-olefin. For example the copolymers can have a molar ratio of diene:1-olefin in the range 2;98 to 98:2, preferably 5:95 to 95:5.

In the process of the present invention one or more catalyst activators are preferably employed. Preferably only one catalyst activator is employed.

The defined transition metal compounds employed preferably differ substantially in terms of their ability to produce cis and trans types of polybutadiene when employed separately from one another and in the absence of any modifier (other than the optional catalyst activator). Thus for example, it is preferred to employ (A1) at least one transition metal compound capable of polymerising butadiene to form a polybutadiene having at least 60, more preferably at least 70, most preferably at least 80 mole % trans-polymerised units and (A2) at least one transition metal compound capable of polymerising butadiene to form at least 60, more preferably at least 70, most preferably at least 80 mole % cis-polymerised units. The ability of the transition metal compound to polymerise butadiene in the defined manner can be determined by simple trial and error experiments.

The amount of each of the defined transition metal compounds employed in the process of the present invention is preferably such that the concentration of any one of these compounds is >0.01 moles %, more preferably >0.02 moles % most preferably at least 0.10 moles % based on total moles of transition metal compound employed as catalyst. For example the ratio of the first to the second transition metals can lie in the range 0.01:99.99 to 99.99:0.01, preferably 0.02: 99.98 to 99.98:0.02, most preferably 0.1 to 99.9 to 99.9 to 0.1.

The defined transition metal compound can be a simple organic or inorganic compound, for example chloride, bromide, sulphate, acetate and carbonate. Preferably the transition metal compound is selected from a complex containing neutral, monoanionic or dianionic ligands. The ligands can be monodentate, bidentate, tridentate or tetradentate. The ligands preferably comprise at least one N, P, O or S atom.

Non-limiting examples of such complexes are described in WO 96/23010, WO 97/02298, WO 98/30609, WO 99/50313, WO 98/40374, WO 00/50470, WO 98/42664, WO 99/12981, WO 98/27124, WO 00/47592, WO 01/58966, WO 02/090365 and WO 02/092611.

A preferred class of transition metal complexes are represented generically by the Formula (I):

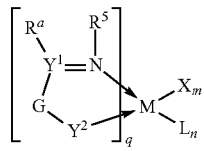

wherein M is Cr[II], Cr[III], Fe[II], Fe[III], Co[II], Co[III] or Ni[II], X represents an atom or group covalently or ionically bonded to the transition metal M; $Y^1$ is C or $P(R^c)$; $Y^2$ is —$O(R^7)$, —O (in which case the bond from O to M is covalent), —$C(R^b)$=O, —$C(R^b)$=$N(R^7)$, —$P(R^b)(R^d)$=$N(R^7)$ or —$P(R^b)(R^d)$=O; $R^a$, $R^b$, $R^c$, $R^d$, $R^5$ and $R^7$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl and substituted heterohydrocarbyl, and any adjacent ones may be joined together to form a ring; G is either a direct bond between $Y^1$ and $Y^2$, or is a bridging group, which optionally contains a third atom linked to M when q is 1; L is a group datively bound to M; n is from 0 to 5; m is 1 to 3 and q is 1 or 2.

One preferred complex is represented by the general formula (II):

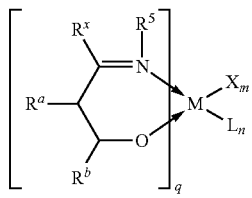

wherein $R^x$ is selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl and substituted heterohydrocarbyl, and all other substituents are as defined above. In the complex of Formula (II), M is preferably Cr, Ni or Co. Preferably $R^a$ and $R^b$ are joined together to form a phenyl, which is preferably substituted. Preferred substituents are $C_1$-$C_6$ alkyl or $C_6$-$C_{24}$ aryl or aralkyl. In particular, the phenyl group may be substituted at the position adjacent the oxygen linkage with a t-butyl group or an anthracenyl group, which may itself be substituted.

A further preferred complex is that of Formula (III):

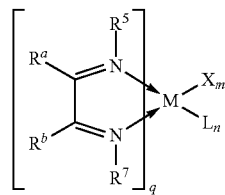

wherein M is Cr[II], Cr[III], Fe[II], Fe[III], Co[II], Co[III] or Ni[II]; X represents an atom or group covalently or ionically bonded to the transition metal M; $R^a$ and $R^b$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl and substituted heterohydrocarbyl, and $R^a$ and $R^b$ may be joined together to form a ring; $R^5$ and $R^7$ are each as defined above; and L is a group datively bound to M; n is from 0 to 5; m is 1 to 3 and q is 1 or 2. Preferably M is Fe or Ni.

A particularly preferred complex has the following Formula (IV):

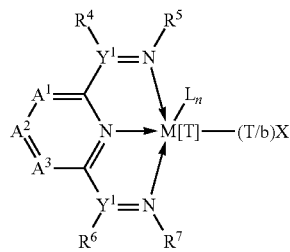

wherein M[T] is Cr[II], Cr[III], Fe[II], Fe[III], Co[II], Co[III] or Ni[II]; X represents an atom or group covalently or ionically bonded to the transition metal M; T is the oxidation state of the transition metal M and b is the valency of the atom or group X; $Y^1$ is C or $P(R^c)$, $A^1$ to $A^3$ are each independently N or P or CR, with the proviso that at least one is CR; R, $R^c$, $R^4$ and $R^6$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl and substituted heterohydrocarbyl; and $R^5$ and $R^7$ are each as defined above.

Preferably $Y^1$ is C. Preferably $A^1$ to $A^3$ are each independently CR where each R is as defined above. In alternative preferred embodiments, $A^1$ and $A^3$ are both N and $A^2$ is CR, or one of $A^1$ to $A^3$ is N and the others are independently CR. Examples of such embodiments include the following:

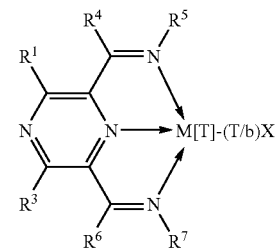

Formula (IVa)

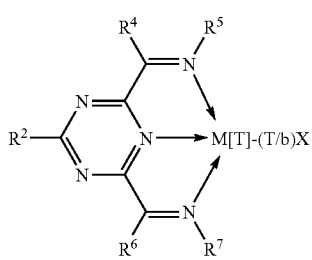

Formula (IVb)

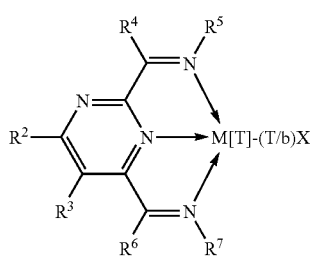

Formula (IVc)

wherein $R^1$, $R^2$ and $R^3$ are each independently H, or $C_1$-$C_{10}$ alkyl, aryl or aralkyl.

Generally in the above Formulae, $R^5$ and $R^7$ are preferably independently selected from substituted or unsubstituted alicyclic, heterocyclic or aromatic groups, for example, phenyl, 1-naphthyl, 2-naphthyl, 2-methylphenyl, 2-ethylphenyl, 2,6-diisopropylphenyl, 2,3-diisopropylphenyl, 2,4-diisopropylphenyl, 2,6-di-n-butylphenyl, 2,6-dimethylphenyl, 2,3-dimethylphenyl, 2,4-dimethylphenyl, 2-t-butylphenyl, 2,6-diphenylphenyl, 2,4,6-trimethylphenyl, 2,6-trifluoromethylphenyl, 4-bromo-2,6-dimethylphenyl, 3,5-dichloro2,6-diethylphenyl, and 2,6-bis(2,6-dimethylphenyl) phenyl, cyclohexyl, pyrolyl, 2,5 dimethylpyrolyl and pyridinyl.

In a preferred embodiment $R^5$ is represented by the group "P" and $R^7$ is represented by the group "Q" as follows:

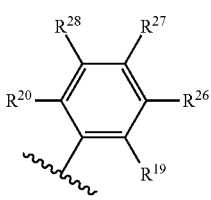

Group P

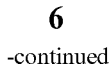

Group Q wherein $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents.

Preferably at least one of $R^{19}$, $R^{20}$, $R^{21}$ and $R^{22}$ is hydrocarbyl, substituted hydrocarbyl, heterohydrocarbyl or substituted heterohydrocarbyl. More preferably at least one of $R^{19}$ and $R^{20}$, and at least one of $R^{21}$ and $R^{22}$, is hydrocarbyl, substituted hydrocarbyl, heterohydrocarbyl or substituted heterohydrocarbyl. Most preferably $R^{19}$, $R^{20}$, $R^{21}$ and $R^{22}$ are all independently selected from hydrocarbyl, substituted hydrocarbyl, heterohydrocarbyl or substituted heterohydrocarbyl. $R^{19}$, $R^{20}$, $R^{21}$ and $R^{22}$ are preferably independently selected from methyl, ethyl, n-propyl, iso-propyl, n-butyl, sec-butyl, tert.-butyl, n-pentyl, neopentyl, n-hexyl, 4-methylpentyl, n-octyl, phenyl and benzy.

$R^1$, $R^2$, $R^3$, $R^4$, $R^6$, $R^{19}$, $R^{20}$, $R^{21}$, $R^{22}$, $R^{23}$, $R^{25}$, $R^{26}$ and $R^{28}$ are preferably independently selected from hydrogen and $C_1$ to $C_8$ hydrocarbyl, for example, methyl, ethyl, n-propyl, n-butyl, t-butyl, n-hexyl, n-octyl, phenyl and benzyl.

A particularly preferred complex has the Formula Z

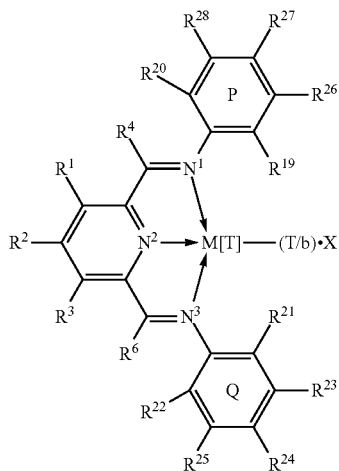

Formula Z wherein $R^1$, $R^2$ and $R^3$ are each independently H, or $C_1$-$C_{10}$ alkyl, aryl or aralkyl and wherein $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents.

Preferred complexes are 2,6-diacetylpyridinebis(2,4,6 trimethyl anil)FeCl$_2$ and 2,6-diacetylpyridinebis(2,6 diisopropyl anil)FeCl$_2$.

In an another embodiment, applicable to all the above structures, $R^5$ is a group having the formula —$NR^{29}R^{30}$ and $R^7$ is a group having the formula —$NR^{31}R^{32}$, wherein $R^{29}$ to $R^{32}$ are independently selected from hydrogen, halogen, hydrocarbyl, substituted hydrocarbyl, heterohydrocarbyl or substituted heterohydrocarbyl, and may be linked to form one or more cyclic substituents. Examples of such compounds are disclosed in WO 00/50470.

Another preferred substituent for both $R^5$ and $R^7$ are pyrazolyl groups, as described in our own co-pending application PCT 02/02247.

Particularly preferred is the substituent having Formula II:

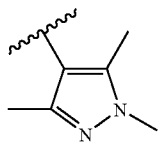

Formula II

The atom or group represented by X in the complexes disclosed above can be, for example, selected from halide, sulphate, nitrate, thiolate, thiocarboxylate, $BF_4^-$, $PF_6^-$, hydride, hydrocarbyloxide, carboxylate, hydrocarbyl, substituted hydrocarbyl and heterohydrocarbyl, or β-diketonates. Examples of such atoms or groups are chloride, bromide, methyl, ethyl, propyl, butyl, octyl, decyl, phenyl, benzyl, methoxide, ethoxide, isopropoxide, tosylate, triflate, formate, acetate, phenoxide and benzoate. Preferred examples of the atom or group X in the compounds of Formula (I) are halide, for example, chloride, bromide; hydride; hydrocarbyloxide, for example, methoxide, ethoxide, isopropoxide, phenoxide; carboxylate, for example, formate, acetate, benzoate; hydrocarbyl, for example, methyl, ethyl, propyl, butyl, octyl, decyl, phenyl, benzyl; substituted hydrocarbyl; heterohydrocarbyl; tosylate; and triflate. Preferably X is selected from halide, hydride and hydrocarbyl. Chloride is particularly preferred.

L may be for example an ether such as tetrahydrofuran or diethylether, an alcohol such as ethanol or butanol, a primary, secondary or tertiary amine, or a phosphine.

Catalysts particularly preferred for use in the present invention are selected from those comprising (1) two or more of the defined transition metal compounds at least one of which has the following Formula A, and optionally (2) an activating quantity of a suitable activator,

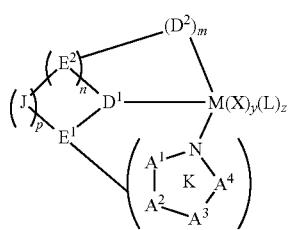

Formula A wherein in the five-membered heterocyclic group K, which can be saturated or unsaturated and unsubstituted or substituted by halide or hydrocarbyl groups, the atoms $A^1$ to $A^4$ comprise at least 2 carbon atoms and at least one atom selected from N, O, P and S, the remaining atom in said ring, if any, being selected from nitrogen and carbon; any 2 or more of $A^1$ to $A^4$ can form part of one or more further ring systems; M is a metal selected from chromium, tungsten, molybdenum, iron, cobalt and nickel; $E^1$ and $E^2$ are atoms or groups bearing single and or double bond connections and being independently selected from a substituted or unsubstituted carbon atom or (i) aliphatic hydrocarbyl, (ii) alicyclic hydrocarbyl, (iii) aromatic hydrocarbyl, (iv) alkyl substituted aromatic hydrocarbyl (v) heterocyclic groups and (vi) heterosubstituted derivatives of said groups (i) to (v); J is a group comprising one or more carbon atoms and optionally one or more atoms selected from N, O, P and S each of which can be substituted or unsubstituted by halogen or hydrocarbyl groups; $D^1$ and $D^2$ are donor atoms or groups; X is an anionic group, L is a neutral donor group; m, n and p are independently 0 or 1; y and z are independently zero or integers such that the number of X and L groups satisfy the valency and oxidation state of the metal M.

For the avoidance of doubt the term "unsubstituted" as used in relation to a hydrocarbyl or heterocyclic group means that any hydrogen atoms normally associated with such group have not been replaced by other groups or atoms.

$E^1$ can be bonded to any of $A^1$ to $A^4$. Preferably $E^1$ is bonded to $A^1$.

The five-membered heterocyclic group K preferably contains 3 carbon atoms in the ring.

In a preferred embodiment of the present invention K is specifically an imidazole-containing group.

$D^1$ and $D^2$ can be the same or different donor atoms or groups, for example oxygen, sulfur, nitrogen or phosphorus, eg an amine, an imine or a phosphine. Preferably $D^1$ and $D^2$ are selected from oxygen, sulfur, an amine of formula —$N(R^{12})$— or a phosphine of formula —$P(R^{13})$— wherein $R^{12}$ and $R^{13}$ are hydrogen or (i) aliphatic hydrocarbyl, (ii) alicyclic hydrocarbyl, (iii) aromatic hydrocarbyl, (iv) alkyl substituted aromatic hydrocarbyl (v) heterocyclic groups, (vi) heterosubstituted derivatives of said groups (i) to (v), (vii) hydrocarbyl-substituted heteroatom groups and (viii) further imidazole-containing groups.

Preferably $D^1$ is nitrogen for example —$NR^1$— or =N— or a nitrogen-containing group, for example —$N(R^1)$—$R^{20}$— wherein $R^1$ represents a monovalent group and $R^{20}$ represents a divalent group derived from, for example, aliphatic hydrocarbyl groups such as methyl, ethyl, ethylenyl, butyl, hexyl, isopropyl and tert-butyl. Examples of suitable alicyclic hydrocarbyl groups are adamantyl, norbornyl, cyclopentyl and cyclohexyl. Examples of suitable aromatic hydrocarbyl groups are phenyl, biphenyl, naphthyl, phenanthryl and anthryl. Examples of suitable alkyl substituted aromatic hydrocarbyl groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^1$ to $R^{11}$ are, for example, chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Any of the substituents $R^1$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl $D^2$ can be, for example, any of the donor atoms or groups specified above for $D^1$.

When $D^1$ and/or $D^2$ are an imidazole-containing group this or these can be identical with K. In a preferred embodiment $D^2$ and K are identical imidazole containing groups.

The imidazole-containing group K is preferably a group selected from Formulae Ia to VIa:

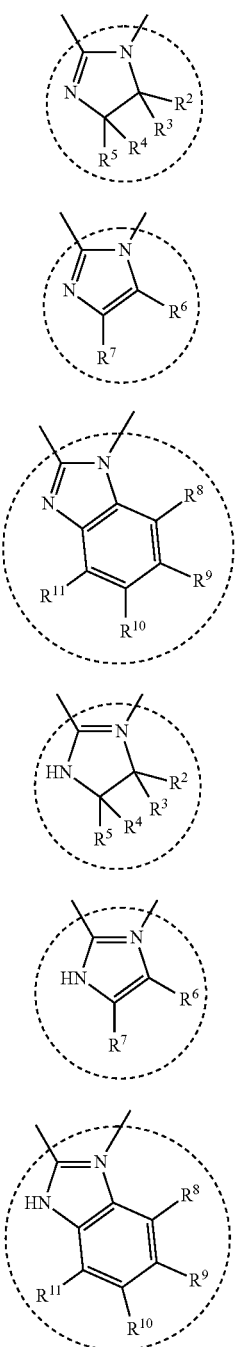

wherein the groups $R^2$ to $R^{11}$ are independently hydrogen or a monovalent (i) aliphatic hydrocarbyl, (ii) alicyclic hydrocarbyl, (iii) aromatic hydrocarbyl, (iv) alkyl substituted aromatic hydrocarbyl (v) heterocyclic groups, (vi) heterosubstituted derivatives of said groups (i) to (v), and (vii) hydrocarbyl-substituted heteroatom groups. It is preferred that the imidazole-containing group has a structure described in formula IIIa or VIa (these are "benzimidazoles").

These defined groups $R^2$ to $R^{11}$ preferably contain 1 to 30, more preferably 2 to 20, most preferably 2 to 12 carbon atoms. Examples of suitable aliphatic hydrocarbyl groups are methyl, ethyl, ethylenyl, butyl, hexyl, isopropyl and tert-butyl. Examples of suitable alicyclic hydrocarbyl groups are adamantyl, norbornyl, cyclopentyl and cyclohexyl. Examples of suitable aromatic hydrocarbyl groups are phenyl, biphenyl, naphthyl, phenanthryl and anthryl. Examples of suitable alkyl substituted aromatic hydrocarbyl groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^2$ to $R^{11}$ are, for example, chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. —$OC_6H_5$), tolyloxy (i.e. —$C_6H_4(CH_3)$), xylyloxy, mesityloxy, dimethylamino, diethylamino, methylethylamino, thiomethyl, thiophenyl and trimethylsilyl. Any of the substituents $R^2$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl.

$E^1$ and $E^2$ (hereinafter referred to as "E") can be the same or different atoms or groups. E is divalent when p is zero, and trivalent when p=1. E is independently selected from (i) aliphatic hydrocarbyl, (ii) alicyclic hydrocarbyl, (iii) aromatic hydrocarbyl, (iv) alkyl substituted aromatic hydrocarbyl (v) heterocyclic groups, (vi) heterosubstituted derivatives of said groups (i) to (v), and (vii) hydrocarbyl-substituted heteroatom groups. Examples of suitable divalent groups E are —$CH_2$—, —$CH_2CH_2$—, —$CH_2CH_2CH_2$—, 1,2-phenylene, trans-1,2-cyclopentane, trans-1,2-cyclohexane, 2,3-butane, 1,1'-biphenyl, 1,1'-binaphthyl, and —$Si(Me)_2$—. It is preferred that E is an aliphatic or aromatic hydrocarbyl group. More preferably the divalent group E is —$CH_2$—. Examples of suitable trivalent groups E are —CH—, —$CHCH_2$—, —$CH_2CHCH_2$—, and —Si(Me)-.

J is a bridging group between $E^2$ and $E^1$. It is preferably a $C_1$ to $C_{12}$ divalent hydrocarbon group. It can, for example, form part of a saturated unsaturated or aromatic ring system. For example, $E^1$, J, $E^2$, $D_1$ and can together from a pyridine, piperidine or pyrrole system wherein $D^1$ is the nitrogen atom and $E^1$, J, $E^2$ from the rest of the ring.

The values of m, n and p in the present invention are independently 0 or 1. Preferably m=n=p. More preferably m and n are both 1 and p is 0 or 1.

When m, n and p are zero in Formula A, the Formula reduces to Formula D.

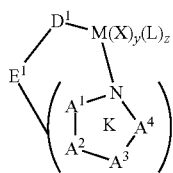

Formula D wherein D1, E1, K, A1 to A4 M, X, L, y and z are as defined above.

The transition metal compounds of Formula A and D can be drawn from a very large variety of compounds. Examples of suitable ligands are illustrated in copending Patent Application WO 2004/083263 published in the name of BP Chemicals on 30 Sep. 2004—see in particular Formulae Nos. 20 to 157.

The five-membered heterocyclic group K contains at least 2 carbon atoms in its ring and preferably has 3 carbon atoms in its ring. Examples of suitable 5-membered heterocyclic groups are shown below wherein one of the nitrogen atoms is bonded to the transition metal and the bond to $E^1$ is depicted by the "free" valency bond:

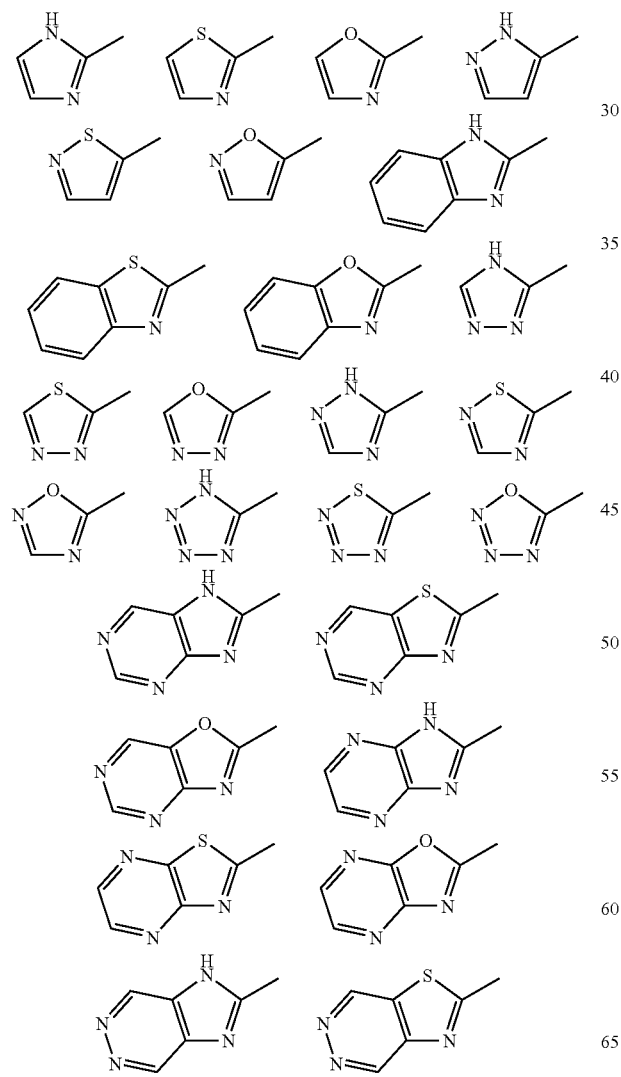

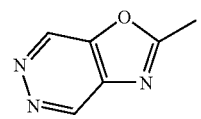

The following are examples of transition metal complexes that can be employed in the catalyst:

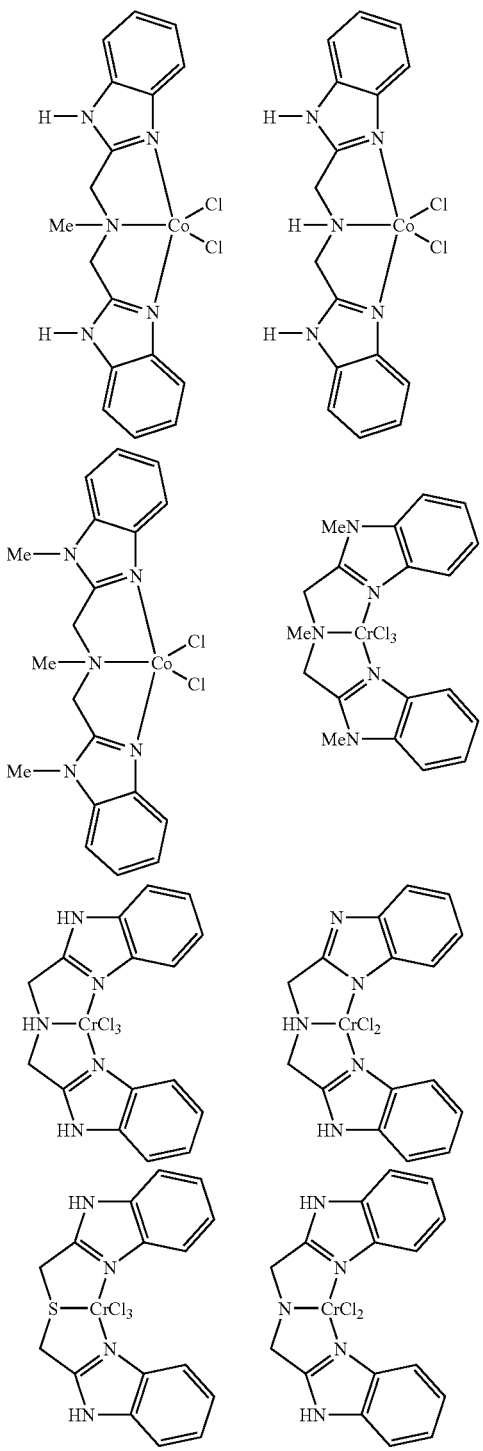

-continued

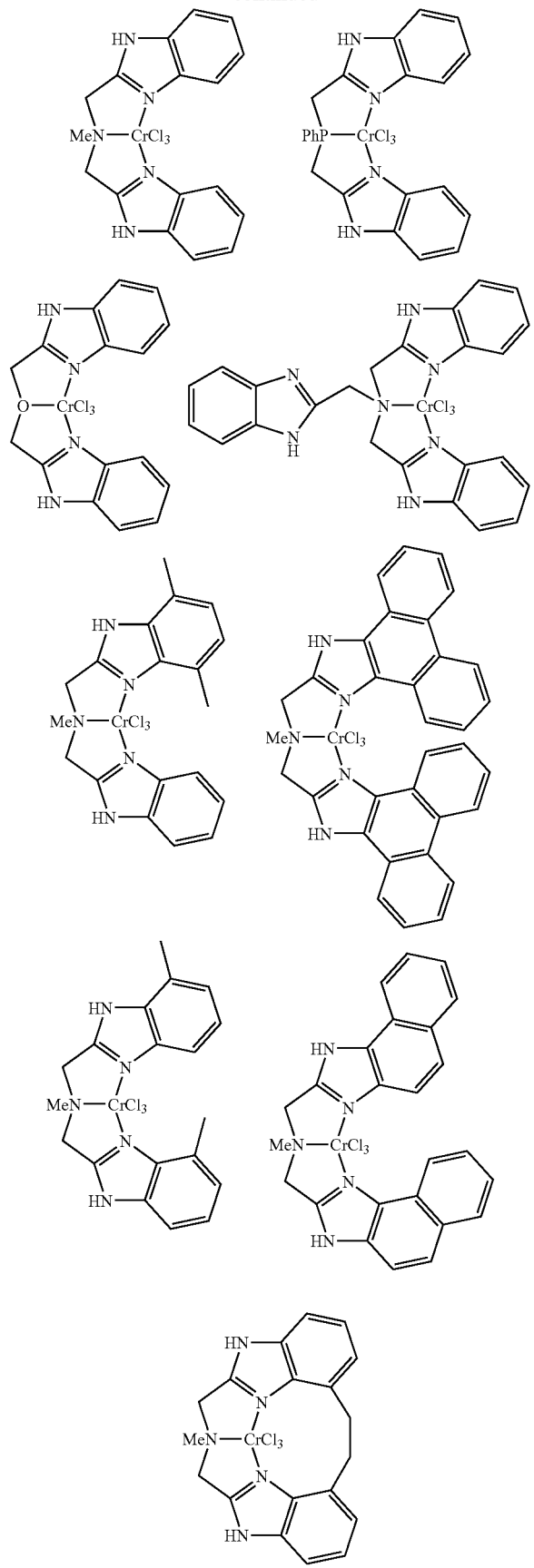

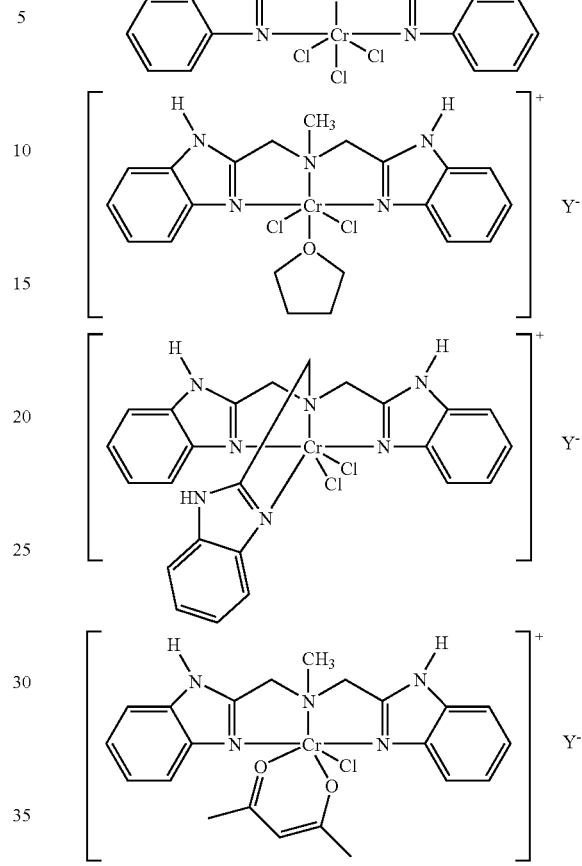

Y is preferably selected from anions such as Cl, $SbF_6$, $BF_4$ and $B(C_6F_5)_4$.

In Formulae A and D, M is a metal selected from Cr, Mo, W, Fe, Co and Ni. The transition metal of the catalysts used in the process of the present invention is most preferably cobalt or chromium.

The anionic group X in Formula A can be, for example, a halide, preferably chloride or bromide; or a hydrocarbyl group, for example, methyl, benzyl or phenyl; a carboxylate, for example, acetate or an acetylacetonate; an oxide; an amide, for example diethyl amide; an alkoxide, for example, methoxide, ethoxide or phenoxide; or a hydroxyl. Alternatively, X can be a non-coordinating or weakly-coordinating anion, for example, tetrafluoroborate, a fluorinated aryl borate or a triflate. The anionic groups X may be the same or different and may independently be monoanionic, dianionic or trianionic.

The neutral donor group L can be, for example, a solvate molecule, for example diethyl ether or THF; an amine, for example, diethyl amine, trimethylamine or pyridine; a phosphine, for example trimethyl phosphine or triphenyl phosphine; or water; or an olefin or a neutral, conjugated or non-conjugated diene, optionally substituted with one or more groups selected from hydrocarbyl or trimethylsilyl groups, said group having up to 40 carbon atoms and forming a pi-complex with M. When L is a diene ligand, it can be, for example s-trans-$\eta^4$-1,4-diphenyl-1,3-butadiene; s-trans-$\eta^4$-3-methyl-1,3-pentadiene; s-trans-$\eta^4$-1,4-dibenzyl-1,3-butadiene; s-trans-$\eta^4$-2,4-hexadiene; s-trans-$\eta^4$-1,3-pentadiene;

s-trans-$\eta^4$-1,4-ditolyl-1,3-butadiene; s-trans-$\eta^4$-1,4-bis(trimethylsilyl)-1,3-butadiene; s-trans-$\eta^4$-1,4-diphenyl-1,3-butadiene; s-cis-$\eta^4$-3-methyl-1,3-pentadiene; s-cis-$\eta^4$-1,4-dibenzyl-1,3-butadiene; s-cis-$\eta^4$-2,4-hexadiene; s-cis-$\eta^4$-1,3-pentadiene; s-cis-$\eta^4$-1,4-ditolyl-1,3-butadiene; or s-cis-$\eta^4$-1,4-bis(trimethylsilyl)-1,3-butadiene, said s-cis isomers forming a .pi.-bound diene complex;

The value of y depends on the formal charge on each group K and D, the charge on the anionic group X and the oxidation state of the metal M. For example, if M is chromium in oxidation state +3, K is a neutral group and both D groups are neutral, then y is 3 if X is a monoanionic group (eg. chloride); if M is chromium in oxidation state +3, the K group is neutral, one D group is monoanionic and the other D is neutral, then y is 2 if all X groups are monoanionic groups (e.g. chloride).

In the process of the present invention the use of transition metal complexes of the metals cobalt and chromium are preferred, especially complexes of Formula A

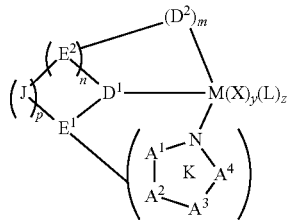

Formula A wherein M is Co or Cr. Most preferably the process of the present invention employs (1) a transition metal compound of Formula A wherein M is Co and a second transition metal compound of Formula A wherein M is chromium.

The catalyst modifier (B) employed in the process of the present invention is preferably selected from the group consisting of a phosphine, a xanthogen, a thiocyanide, a carbon disulphide, and mixtures thereof. The purpose of the modifier is, for example, to provide some control over the content of the 1,2-configured units and/or the stereoreregularity of the 1,2-vinyl configuration of the polydiene. The modifier is preferably selected from tertiary phosphines, having the general formula $PR^8R^9R^{10}$, wherein P is phosphorus and $R^8$, $R^9$ and $R^{10}$ are alkyl, aryl, or hydrogen. Preferred alkyl groups are straight chain, branched chain or cyclic alkyl groups or aryl, alkaryl or aralkyl groups having 1 to 12 carbon atoms, for example methyl, ethyl, propyl, isopropyl, butyl, isobutyl, hexyl, octyl and cyclohexyl groups. Preferred aryl groups are phenyl, tolyl, ethylphenyl and isopropylphenyl. Preferred phosphines include for example, tri(3-methylphenyl)-phosphine, tri(3-ethylphenyl)-phosphine, tri(4-methylphenyl)-phosphine, tri(3,5-dimethylphenyl)-phosphine, tri(3,4-dimethylphenyl)-phosphine, tri(3-isopropylphenyl)-phosphine, tri(3-tertiary butylphenyl)-phosphine, tri(3-methyl-5-ethylphenyl)phosphine, tri(3-phenylphenyl)phosphine, tri(3,4,5-trimethylphenyl)phosphine, tri(4-methoxy-3,5-dimethylphenyl)phosphine, tri(4-ethoxy-3,5-dimethylphenyl)phosphine, tri(4-butoxy-3,5-dibutylphenyl)-phosphine, tri(4-methoxyphenyl)phosphine, tricyclohexylphosphine, dicyclohexylphenylphosphine, dicyclohexylbenzylphosphine, tribenzylphenylphosphine, tri(4-methylphenyl)phosphine, 1,2-diphenylphosphinoethane, 1,3-diphenylphosphinopropane, 1,4-diphenylphosphinobutane, tri(4-ethylphenyl) phosphine and the like, and aliphatic phosphines such as triethylphosphine, tributylphosphine and the like. Of these, particularly preferable are triphenylphosphine, tri(3-methylphenyl)phosphine, tri(4-methoxy-3,5-dimethylphenyl)phosphine, tri(4-methoxyphenyl)phosphine, tri(dicyclohexylphenyl)phosphine, tricyclohexylphosphine, tribenzylphosphine, tributylphosphine, dicyclohexylbenzylphosphine and tri(4-methylphenyl)phosphine. Also suitably used as catalyst modifier are sulphur compounds selected from xanthogens, carbon disulphide and thioisocyanides. Suitable xanthogen compounds are disclosed, for example, in U.S. Pat. No. 4,742,137. Specific examples of xanthogen compounds include diethylxanothogen sulfide, dimethylxanthogen sulfide, phenylxanthogen sulfide, tolylxanthogen sulfide, and mixtures thereof. Suitable thioisocyanide compounds are disclosed, for example, in U.S. Pat. No. 5,548,045. Specific examples of the thioisocyanide compound include phenyl thioisocyanide, tolyl thioisocyanide, and mixtures thereof.

The catalyst modifier is employed in an amount ranging from 0.01 to 10, preferably 0.05 to 5.0, moles per mole of transition metal compounds (in total) employed in the process of the present invention.

The optional activator (2) for the catalyst used in the process of the present invention is preferably selected from organoaluminium compounds and organoboron compounds or mixtures thereof. Examples of organoaluminium compounds include trialkyaluminium compounds, for example, trimethylaluminium, triethylaluminium, tributylaluminium, tri-n-octylaluminium, ethylaluminium dichloride, diethylaluminium chloride, tris(pentafluorophenyl)aluminium and alumoxanes. Alumoxanes are well known in the art as typically the oligomeric compounds which can be prepared by the controlled addition of water to an alkylaluminium compound, for example trimethylaluminium. Such compounds can be linear, cyclic or mixtures thereof. Commercially available alumoxanes are generally believed to be mixtures of linear, cyclic and cage compounds. The cyclic alumoxanes can be represented by the formula $[R^{16}AlO]_s$ and the linear alumoxanes by the formula $R^{17}(R^{18}AlO)_s$ wherein s is a number from about 2 to 50, and wherein $R^{16}$, $R^{17}$, and $R^{18}$ represent hydrocarbyl groups, preferably $C_1$ to $C_6$ alkyl groups, for example methyl, ethyl or butyl groups.

Examples of suitable organoboron compounds are dimethylphenylammonium tetra(phenyl)borate, trityltetra(phenyl) borate, triphenylboron, dimethylphenylammonium tetra(pentafluorophenyl)borate, sodium tetrakis[(bis-3,5-trifluoromethyl)phenyl]borate, $H^+(OEt_2)[(bis$-3,5-trifluoromethyl)phenyl]borate, trityltetra(pentafluorophenyl)borate and tris(pentafluorophenyl) boron. Mixtures of organoaluminium compounds and organoboron compounds may be used.

The quantity of the optional activator compound used in the process of the present invention ie, the activator selected from organoaluminium compounds and organoboron compounds, is easily determined by simple testing, for example, by the preparation of small test samples which can be used to polymerise small quantities of the monomer(s) and thus to determine the activity of the produced catalyst. It is generally found that the quantity employed is sufficient to provide 0.1 to 20,000 atoms, preferably 1 to 2000 atoms of aluminium or boron per atom of M present in the compound of Formula A. Mixtures of different activating compounds may be used.

EP1238989 discloses the use of activators (Lewis acids) selected from
(b-1) ionic-bonding compounds having a $CdCl_2$ type or a $CdI_2$ type of layered crystal structure;
(b-2) clays, clay minerals, or ion-exchange layered compounds;

(b-3) heteropoly-compounds; and (b-4) halogenated lanthanoid compounds.

The optional activator employed in the present invention may be of the type disclosed in EP1238989 if desired. Such Lewis acids are those compounds which capable of receiving at least one electron pair and is capable of forming an ion pair by reaction with the transition metal complex. The Lewis acid includes the afore-mentioned (b-1) ionic-bonding compounds having a layered crystal structure of a $CdCl_2$ type or $CdI_2$ type (b-2) clay. clay minerals, or ion-exchange layered compounds, (b-3) heteropoly compounds, and (b-4) halogenated lanthanoid compounds. The Lewis acid further includes $SiO_2$, $Al_2O_3$, natural and synthetic zeolites which have Lewis acid points formed by heating or a like treatment, and complexes and mixtures thereof.

U.S. Pat. No. 6,399,535 discloses a coordinating catalyst system capable of polymerizing olefins comprising:

(I) as a pre-catalyst, at least one non-metallocene, non-constrained geometry, bidentate ligand containing transition metal compound or tridentate ligand containing transition metal compound capable of (A) being activated upon contact with the catalyst support-activator agglomerate of (II) or (B) being converted, upon contact with an organometallic compound, to an intermediate capable of being activated upon contact with the catalyst support-activator agglomerate of (II), wherein the transition metal is at least one member selected from Groups 3 to 10 of the Periodic table; in intimate contact with (II) catalyst support-activator agglomerate comprising a composite of (A) at least one inorganic oxide component selected from $SiO_2$, $Al_2O_3$, MgO, $AlPO_4$, $TiO_2$, $ZrO_2$, and $Cr_2O_3$ and (B) at least one ion containing layered material having interspaces between the layers and sufficient Lewis acidity, when present within the catalyst support-activator agglomerate, to activate the pre-catalyst when the pre-catalyst is in contact with the catalyst support-activator agglomerate, said layered material having a cationic component and an anionic component, wherein said cationic component is present within the interspaces of the layered material, said layered material being intimately associated with said inorganic oxide component within the agglomerate in an amount sufficient to improve the activity of the coordinating catalyst system for polymerizing ethylene monomer, expressed as Kg of polyethylene per gram of catalyst system per hour, relative to the activity of a corresponding catalyst system employing the same pre-catalyst but in the absence of either Component A or B of the catalyst support-activator agglomerate; wherein the amounts of the pre-catalyst and catalyst support-activator agglomerate which are in intimate contact are sufficient to provide a ratio of micromoles of pre-catalyst to grams of catalyst support-activator agglomerate of from about 5:1 to about 500:1. The layered material can be, for example, a smectite clay. The catalyst system of the present invention can be employed with a catalyst support-activator agglomerate as described in U.S. Pat. No. 6,399,535 if desired.

The catalysts employed in the present invention comprise at least two defined transition metal compounds. The catalyst is useful for making polydienes having a controlled ratio of cis to trans polymer. For example it is found that the use of complexes of Formula A (and preferably of Formula D) containing chromium as the transition metal favour the formation of trans polydiene, whereas the use of such complexes containing cobalt as the transition metal favour the formation of cis polydiene. Thus in the polymerisation of diene in the presence of the mixed catalysts, the ratio of two (or more) catalysts (eg one cobalt-based and the other chromium-based) can be adjusted to provide a desired ratio of cis/trans polymer in the product. Adjustment of the level of the defined catalyst modifier provides means of controlling the content of polybutadiene having 1,2-vinyl configuration in the product polydiene.

The catalyst or catalysts employed in the process of the present invention can be utilised, if desired, using processes analogous to those disclosed in WO02/46246 and U.S. Pat. No. 6,605,675. For example, a catalyst component slurry and a catalyst component solution can be combined before or during introduction into the polymerisation reactor. The properties of polymers produced using such methods can be advantageously controlled thereby. The catalysts of the present invention can also be employed in the process disclosed in U.S. Pat. No. 6,610,799. In this process, mixtures of two or more supported catalysts can be utilised containing differing amounts of catalyst components wherein the concentrations of the individual catalyst components can be independently controlled within the polymerisation reactor.

One or more of the catalysts, and or components thereof, used in the process of the present invention can, if desired, be utilised on a support material. Thus, for example, the catalyst system can comprise one or more transition metal compounds supported on the same or different types of support material and one or more activators supported on the same or different support materials. Suitable support materials are, for example, silica, alumina, or zirconia, magnesia, magnesium chloride or a polymer or prepolymer, for example polyethylene, polystyrene, or poly(aminostyrene).

If desired the catalysts can be formed in situ in the presence of the support material, or the support material can be pre-impregnated or premixed, simultaneously or sequentially, with one or more of the catalyst components. Formation of the supported catalyst can be achieved for example by treating the transition metal compounds of the present invention with alumoxane in a suitable inert diluent, for example a volatile hydrocarbon, slurrying a particulate support material with the product and evaporating the volatile diluent. The produced supported catalyst is preferably in the form of a free-flowing powder. The quantity of support material employed can vary widely, for example from 100,000 to 1 grams per gram of metal present in the transition metal compound.

The monomer employed in the polymerisation process of the present invention comprises a diene having the general formula $R^1R^2C=CR^3CR^4=CR^5CR^6$ wherein $R^1$ to $R^6$ are independently selected from hydrogen, halogen, alkyl, cycloalkyl, aryl, aralkyl, and alkaryl. For example the monomer can be a diene having substitution selected from one or more of chloro, methyl, ethyl, n-propyl, isopropyl, or single or mixtures of isomeric forms of pentyl, hexyl, octyl, decyl; or aryl groups selected from, for example, phenyl, 2 chlorophenyl, o-biphenyl, naphthyl, phenanthryl and anthryl; or alkaryl groups selected from, for example, phenylmethyl, phenylethyl, phenyl-n-propyl, naphthylmethyl; or aralkyl groups, for example, tolyl. xylyl, mesityl or 2-methylnaphthyl. However, when the diene is too heavily substituted by bulky groups it may be difficult or impossible to cause the diene to polymerise due to steric hindrance. The diene employed preferably has the general formula $R^1H—C=CR^3—CH=CH_2$ wherein $R^1$ and $R^3$ are independently selected from hydrogen, chlorine and a $C_1$ to $C_{10}$ hydrocarbyl group. Preferred dienes are 1,3-butadiene, 2-methyl-1,3-butadiene (isoprene), and 2-chloro-1,3-butadiene (chloroprene).

The optional comonomer 1-olefin is any suitable 1-olefin, preferably $C_2$ to $C_{20}$ 1-olefin, capable of being copolymerised with a diene to form the defined polymer. Examples of such olefins are ethylene, propylene, butene, hexene, 4-methylpentene-1, 1-octene, norbornene, substituted norbornenes and styrene.

The polymerisation process of the present invention can be carried out in a single reactor or in one or more reactors placed in series or in parallel. In the case that a single reactor is used, the reactor is fed with monomeric material and at least two transition metal compounds. The transition metal compounds can be fed separately or together. If desired the transition metal compounds can be fed simultaneously or at different times. In the case that two or more reactors are used in series, the first reactor is fed with at least one of the transition metal compound and the first or/or at least one further reactor is fed with at least one further transition metal compound. The polymerisation conditions can be, for example, bulk phase, solution phase, slurry phase or gas phase. If desired, the catalyst can be used to polymerise the monomer under high pressure/high temperature process conditions wherein the polymeric material forms as a melt in supercritical monomer. Preferably the polymerisation is conducted under solution phase or gas phase fluidised or stirred bed conditions. In these processes the polymerisation conditions can be batch, continuous or semi-continuous. In the slurry phase process and the gas phase process, the catalyst is generally fed to the polymerisation zone in the form of a particulate solid. This solid can be, for example, an undiluted solid catalyst system formed from the one or more of the defined transition metal compounds and optionally an activator, or can be the solid transition metal compound(s) alone. In the latter situation, the activator can be fed to the polymerisation zone, for example as a solution, separately from or together with the solid transition metal compound. Preferably the catalyst system or the transition metal compound component of the catalyst system employed in slurry polymerisation and gas phase polymerisation is supported on a support material. Most preferably the catalyst system is supported on a support material prior to its introduction into the polymerisation zone. Suitable support materials are, for example, silica, alumina, zirconia, talc, kieselguhr, magnesia, magnesium chloride and polymers. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques.

In the slurry phase polymerisation process the solid particles of catalyst, or supported catalyst, are fed to a polymerisation zone either as dry powder or as a slurry in the polymerisation diluent. Preferably the particles are fed to a polymerisation zone as a suspension in the polymerisation diluent. The polymerisation zone can be, for example, an autoclave or similar reaction vessel, or a continuous loop reactor, e.g. of the type well know in the manufacture of polyethylene using silica supported chromium oxide catalysts. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

The use of hydrogen gas as a means of controlling the average molecular weight of the polymer or copolymer applies generally to the polymerisation process of the present invention. For example, hydrogen can be used to reduce the average molecular weight of polymers or copolymers prepared using gas phase, slurry phase or solution phase polymerisation conditions. The quantity of hydrogen gas to be employed to give the desired average molecular weight can be determined by simple "trial and error" polymerisation tests.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (eg recycled gaseous monomer) and/or volatile liquid (eg a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid is small in relation to the quantity of polymer present in the polymerisation zone. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

When operating the process of the present invention under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083, the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

A problem that can occur in the gas and slurry phase polymerisation of olefins is that of fouling of the reactor walls, any stirrer that may be present and spalling or agglomeration of the polymer due, for example, to the presence of static electricity. The problem can be reduced or eliminated by judicious use of suitable antistatic agents. One example of a family of antistatic agents suitable for use in the polymerisation of olefins are commercially available under the trade name "STADIS".

The process of the present invention can be carried out in conventional commercial polymerisation facilities and its use can be sandwiched between production runs using other commercial catalyst systems of the supported or unsupported type, eg, using Ziegler Natta catalysts, metallocene catalysts, heat activated chromium oxide catalysts and late transition metal catalyst systems. Transitioning between catalyst systems of these types has been extensively described in the prior art and reference may be made to the prior art methods for analogously suitable methods readily adaptable to use of the catalyst of the present invention. For example, see EP 751965, U.S. Pat. No. 5,442,019, U.S. Pat. No. 5,672,665, U.S. Pat. No. 5,747,612, U.S. Pat. No. 5,753,786, EP 830393, U.S. Pat. No. 5,672,666, EP1171486, EP885247, EP1182216, U.S. Pat. No. 6,284,849. US2004/0127655, WO04/060938, US2004/0138391, WO, 04/060921, WO04/060922, WO04/060929, WO04/060930, and WO04/060931.

Preferably the polymers of the present invention contain not more than 1.0 moles %, more preferably <0.7 moles %, even more preferably <0.5 moles % percent, most preferably <0.1 moles % of pendant vinyl groups based on the molar content of polymerised diene units. Levels of pendant vinyl groups about 0.01% or less are particularly preferred.

The present invention is illustrated in the following Examples.

EXAMPLES

Experimental Procedure

All manipulations were carried out under an atmosphere of $N_2$ using standard Schlenk techniques or conventional nitrogen-filled dry-box. Diethyl ether was dried over sodium benzophenone ketyl and distilled under nitrogen. THF was dried over potassium and distilled under nitrogen. Toluene and pentane were dried by passing through a column filled with commercially available Q-5 reactant (Cu(II)O on alumina 13% w/w) and activated alumina (pellets, 3 mm). MAO (Crompton GMBH) was used without further purification.

Polymer Characterisation

The average molecular weighs ($M_w$ and $M_n$) of polybutadienes were determined by gel-permeation chromatography (GPC) using polystyrene standards and chloroform (HPLC grade) as solvent at 35° C. $^{13}C$ NMR spectra were recorded on a Jeol 270 MHz spectrometer operating at 130° C. using $C_2D_2Cl_4$ or a mixture of $C_2D_2Cl_4/C_6H_3Cl_3$ (1:2) as solvent. $^1H$ NMR measurements were performed with a Bruker AC-250 MHz spectrometer operating at 25° C. using $CDCl_3$ as solvent. IR spectra were obtained on a Perkin Elmer 1760X FT-IR (KBr disc).

Example 1

1a Synthesis of N,N-bis(1H-benzimidazol-2-ylmethyl)-N-methylamine ("Ligand 1a")

o-phenylenediamine (5.88 g, 54.40 mmol) and methyliminodiacetic acid (4.00 g, 27.2 mmol) were stirred in ethyleneglycol (20 ml) at 190° C. for 4 hours. The water by-product was distilled from the reaction mixture which was then allowed to cool to room temperature. The product was triturated with water (120 ml), filtered, washed with water (4×20 ml), recrystallised from hot methanol-water (1:30) and finally dried at 60° C. under vacuum for two days. Yield 6.88 g (87%). $^1H$ NMR (250.13 MHz, $CD_3OD$, r.t.), δ 2.29 (s, 3H, $NCH_3$), 3.92 (s, 4H, $N(CH_2)_2$), 7.19-7.23 (m, $J^3$=3.35 Hz, 4H, ArH), 7.52-7.56 (m, $J^3$=3.35 Hz, 4H, ArH). $^{13}C$ NMR (62.9 MHz, DMSO-$d_6$, r.t.) δ 47.31 ($CH_3$), 59.97 ($NCH_2$), 126.66 (ArC), 157.45 (ArCq). Anal. Calc. for $C_{17}H_{17}N_5$ (in %) C, 70.10; H, 5.84; N, 24.05. Found C, 70.22; H, 6.05; N, 23.76. +CI MS: (m/z): 292 ([MH$^+$]).

1b. Synthesis of N,N-bis(1H-benzimidazol-2-ylmethyl)-N-methylamine Chromium (III) Chloride ("Complex 1b")

Equimolar quantities of "Ligand 1a" (2 g, 6.87 mmol) and $CrCl_3(THF)_3$ (2.57 g, 6.87 mmol) were stirred in 20 ml of THF for 12 hours. The product was filtered, washed twice with THF (2×20 ml), once with diethyl ether (20 ml) and dried under vacuum. Yield 2.87 g (93%). Anal. Calc. for $C_{17}H_{17}Cl_3CrN_5$ (in %): C 45.40, H 3.81, N 15.57. Found C, 45.35; H, 3.76; N, 15.66. IR (KBr, cm$^{-1}$), ν 3221 (NH, s), ν 1622-1544 (ArC=C, C=N, m), δ 1455, 1477, 1497 (N—H, s), ν 1274 (CN, s), 753 (CH, s).UV-VIS (DMF, 298 K): $\lambda_{max}$/nm ($\epsilon_{max}$/dm$^3$ mol$^{-1}$ cm$^{-1}$)=464 (156), 659 (75), 723 (shoulder). +FAB-MS: (m/z): 413 ([M-Cl]$^+$), 291 ([M-CrCl$_3$]). $\mu_{eff}$=3.60 MB

1c. Synthesis of N,N-bis(1H-benzimidazol-2-ylmethyl)-N-methylamine Cobalt (II) Chloride ("Complex 1c")

Equimolar quantities of "Ligand 1a" (0.56 g, 1.93 mmol) and $CoCl_2$ (0.25 g, 1.93 mmol) were stirred in 40 ml of THF for 24 hours and then refluxed for 4 h. The product was filtered, washed three times with THF (3×20 ml), once with diethyl ether (20 ml) and dried under vacuum. Yield 0.69 g, (85%). IR (KBr, cm$^{-1}$), ν 3200 (NH, s), ν 1620-1540 (ArC=C, C=N, m), δ 1489-1454 (N—H, s), δ 764 (CH, s). +FAB-MS: (m/z): 385 ([M-Cl]$^+$), 420 ([M-H]+), 769 ([2M-2Cl]2+), 807 ([2M-Cl]+).

1d. Polymerisation of Butadiene

A glass Schlenk reactor equipped with a magnetic stirrer was charged with 0.5 mg of Complex 1b (1 μmol), 1.3 mg of Complex 1c (3 μmol) and 4 ml of a 1.6 M solution of MAO in toluene (6.4 mmol). After stirring the mixture for 5 minutes, 0.06 ml of a 2.5×10$^{-2}$ M solution of PPh$_3$ modifier in toluene were added and stirred for a further 10 minutes. 1,3-Butadiene in toluene (20 ml, 2 M, for 2.2 g of 1,3-butadiene) was then injected. The polymerisation reaction was performed under vigorous stirring at room temperature for 40 minutes. The reaction was terminated by venting the unreacted butadiene followed by the addition of methanol. The precipitated polymer was washed with methanol, separated by filtration and dried under vacuum at 60° C. for 24 h. Polymer yield 0.88 g. Conversion of 1,3-butadiene into polybutadiene, 40%. The composition of the resultant polybutadiene blend was 29.4 mol % trans-1,4; 38.0 mol % cis-1,4 and 32.6 mol % 1,2-vinyl by FT-IR spectroscopy. Further polymerisations of 1,3-butadiene using 1/2/MAO/PPh$_3$ at different Cr/Co molar ratios were carried out following the procedure described above. The results are presented in Table 1.

TABLE 1

| Run | Cr/Co | PPh$_3$/M$_t$ | Al/M$_t$ | Yield % | 1,4-trans | 1,4-cis | 1,2-vinyl | M$_n$ | M$_w$ | PDI |
|---|---|---|---|---|---|---|---|---|---|---|
| 1 | 1/3 | 1.5/4 | 1600 | 40 | 29.4 | 38.02 | 32.6 | | | |
| 2 | 1/6 | 2.5/7 | 1100 | 14 | 83.4 | 5.4 | 11.2 | | | |
| 3 | 1/10 | 1/1 | 580 | 98 | 4.9 | 21.0 | 74.1 | 163130 | 385510 | 2.36 |
| 4 | 1/30 | 1/1 | 260 | 99 | 4.7 | 24.0 | 71.3 | 93100 | 263090 | 2.83 |
| 5 | 1/50 | 1/1 | 220 | 99 | 5.3 | 13.7 | 81.0 | 89610 | 210520 | 2.35 |
| 6 | 1/70 | 1/1 | 225 | 99 | 4.8 | 16.0 | 79.2 | 74720 | 177110 | 2.37 |
| 7 | 1/90 | 1/1 | 195 | 99 | 4.8 | 12.8 | 82.4 | 72030 | 162260 | 2.25 |

Notes on the Table
"M$_t$" is the total amount of transition metal Cr plus Co
The Al is derived from the MAO (see "Example 1.4 Polymerisation of butadiene" above)
"Y" is the percentage yield based on grams polybutadiene obtained/grams butadiene fed.
The microstructure of the polybutadiene was determined using FTIR.

The invention claimed is:

1. A catalyst system comprising (A) a first transition metal compound selected from Cr compounds, and a second transition metal compound selected from Co compounds, (B) a catalyst modifier selected from the group consisting of a phosphine, a xanthogen, a thiocyanide, carbon disulfide and mixtures thereof, and optionally (C) one or more catalyst activators, wherein each of said first and second transition metal compounds is represented by the Formula A:

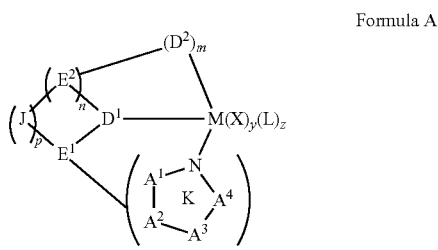

Formula A wherein the five-membered heterocyclic group K can be saturated or unsaturated and unsubstituted or substituted by halide or hydrocarbyl groups, the atoms $A^1$ to $A^4$ comprise at least 2 carbon atoms and at least one atom selected from N, O, P and S, the remaining atom in said ring, if any, being selected from nitrogen and carbon; any 2 or more of $A^1$ to $A^4$ can form part of one or more further ring systems; M is a metal selected from chromium and cobalt; $E^1$ and $E^2$ are atoms or groups bearing single and or double bond connections and being independently selected from a substituted or unsubstituted carbon atom or (i) aliphatic hydrocarbyl, (ii) alicyclic hydrocarbyl, (iii) aromatic hydrocarbyl, (iv) alkyl substituted aromatic hydrocarbyl (v) heterocyclic groups and (vi) heterosubstituted derivatives of said groups (i) to (v); J is a group comprising one or more carbon atoms and optionally one or more atoms selected from N, O, P and S each of which can be substituted or unsubstituted by halogen or hydrocarbyl groups; $D^1$ and $D^2$ are donor atoms or groups; X is an anionic group, L is a neutral donor group; m, n and p are independently 0 or 1; y and z are independently zero or integers such that the number of X and L groups satisfy the valency and oxidation state of the metal M.

2. A catalyst system as claimed in claim 1 wherein the catalyst modifier is selected from tertiary phosphines having the general formula PR$^8$R$^9$R$^{10}$, wherein P is phosphorus and R$^8$, R$^9$ and R$^{10}$ are alkyl, aryl, or hydrogen.

3. A catalyst system as claimed in claim 1 wherein the catalyst modifier is selected from tri(3-methylphenyl)-phosphine, tri(3-ethylphenyl)-phosphine, tri(4-methylphenyl)-phosphine, tri(3,5-dimethylphenyl)-phosphine, tri(3,4-dimethylphenyl)-phosphine, tri(3-isopropylphenyl)-phosphine, tri(3-tertiary butylphenyl)-phosphine, tri(3-methyl-5-ethylphenyl)phosphine, tri(3-phenylphenyl)phosphine, tri(3,4,5-trimethylphenyl)phosphine, tri(4-methoxy-3,5-dimethylphenyl)phosphine, tri(4-ethoxy-3,5-dimethylphenyl)phosphine, tri(4-butoxy-3,5-dibutylphenyl)-phosphine, tri(4-methoxyphenyl)phosphine, tricyclohexylphosphine, dicyclohexylphenylphosphine, dicyclohexylbenzylphosphine, tribenzylphenylphosphine, tri(4-methylphenyl)phosphine, 1,2-diphenylphosphinoethane, 1,3-diphenylphosphinopropane, 1,4-diphenylphosphinobutane, tri(4-ethylphenyl)phosphine, triethylphosphine and tributylphosphine.

4. A catalyst system as claimed in claim 1 wherein the catalyst modifier is triphenyl phosphine.

5. A catalyst system as claimed in claim 1 wherein the second transition metal compound comprises a cobalt compound selected from the group consisting of:

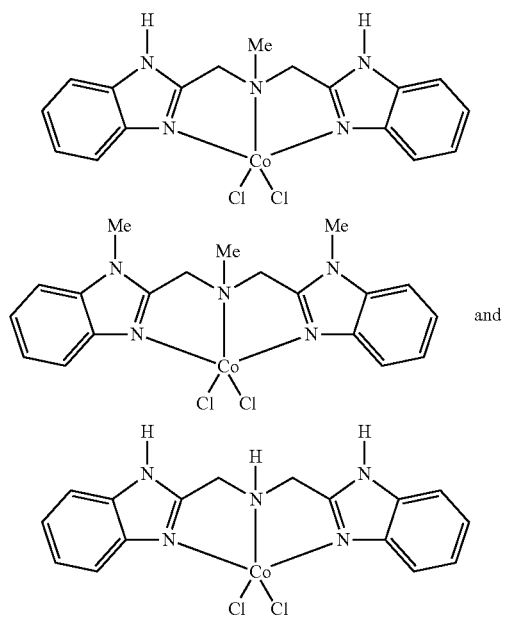

wherein Me is methyl.

6. A catalyst system as claimed in claim 1 wherein the first transition metal compound comprises a chromium compound selected from the group consisting of:

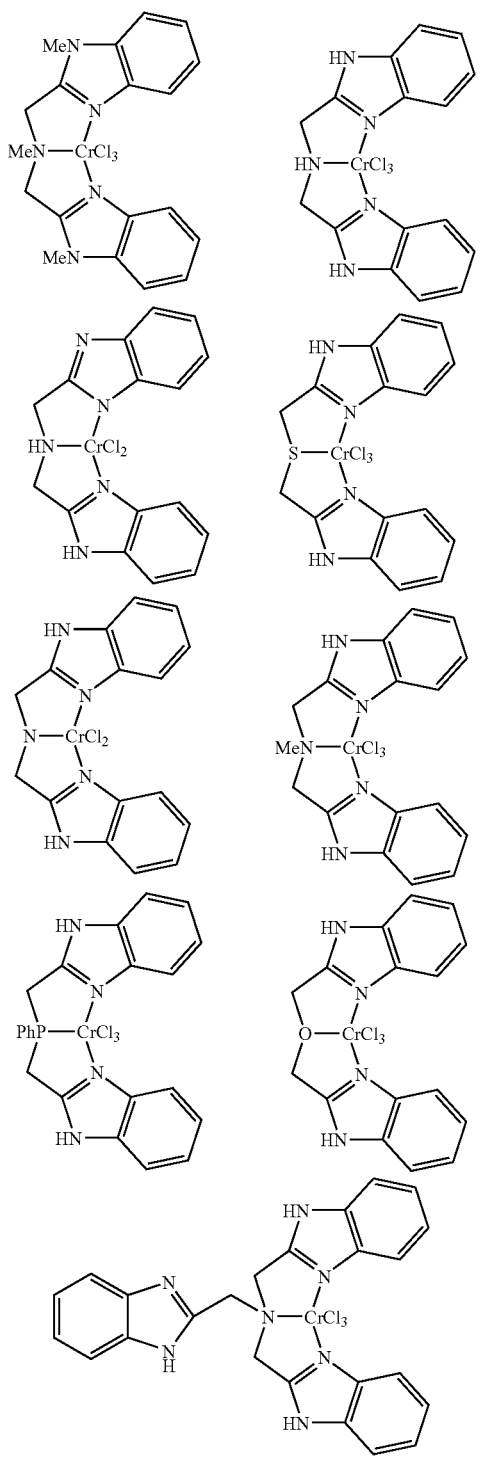
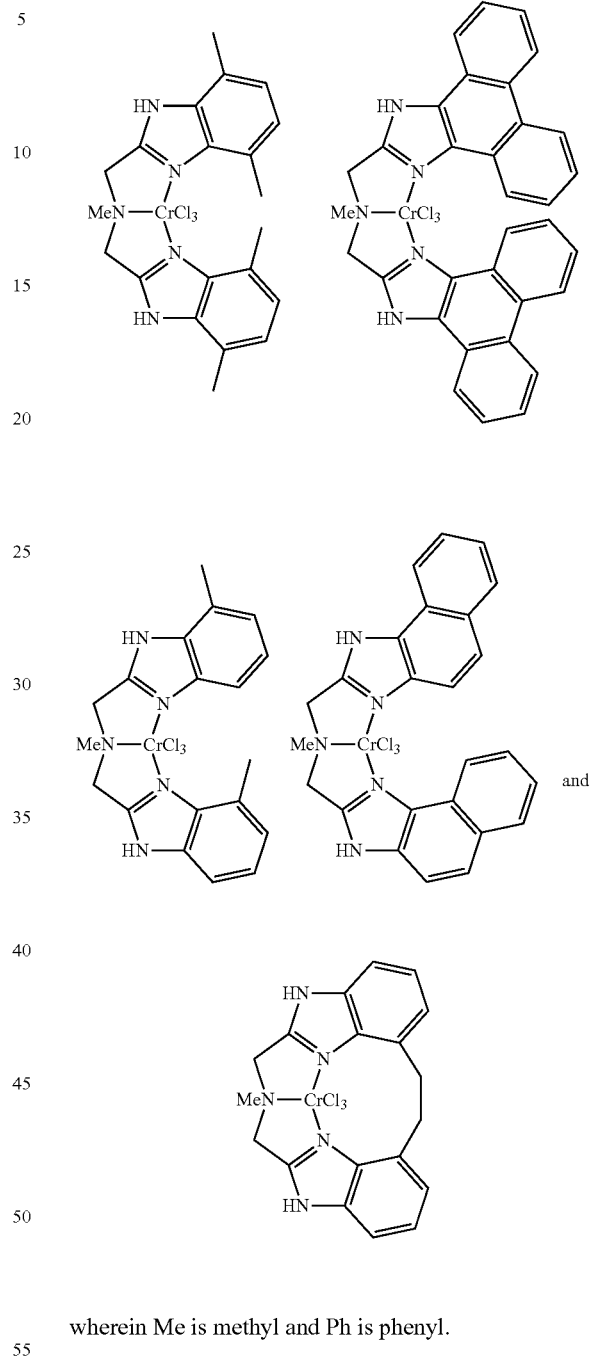
wherein Me is methyl and Ph is phenyl.
* * * * *